US011343224B2

(12) United States Patent
Gu

(10) Patent No.: US 11,343,224 B2
(45) Date of Patent: May 24, 2022

(54) METHOD FOR RENEWING IP ADDRESS AND APPARATUS

(71) Applicant: HUAWEI TECHNOLOGIES CO., LTD., Shenzhen (CN)

(72) Inventor: Jianguo Gu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 81 days.

(21) Appl. No.: 16/400,036

(22) Filed: May 1, 2019

(65) Prior Publication Data

US 2019/0260709 A1    Aug. 22, 2019

Related U.S. Application Data

(63) Continuation of application No. PCT/CN2017/088531, filed on Jun. 15, 2017.

(30) Foreign Application Priority Data

Nov. 2, 2016    (CN) .......................... 201610945341.5

(51) Int. Cl.
| | |
|---|---|
| *G06F 15/16* | (2006.01) |
| *H04L 61/5053* | (2022.01) |
| *H04L 61/5014* | (2022.01) |
| *H04L 61/103* | (2022.01) |
| *H04L 101/622* | (2022.01) |

(52) U.S. Cl.
CPC ........ *H04L 61/2053* (2013.01); *H04L 61/103* (2013.01); *H04L 61/2015* (2013.01); *H04L 61/6022* (2013.01)

(58) Field of Classification Search
CPC ............... H04L 61/103; H04L 61/2015; H04L 61/2053; H04L 61/6022; H04L 61/20
See application file for complete search history.

(56) References Cited

U.S. PATENT DOCUMENTS

| | | | | |
|---|---|---|---|---|
| 6,952,428 B1 * | 10/2005 | Necka | ............... | H04L 29/12273 370/352 |
| 6,957,276 B1 * | 10/2005 | Bahl | ................... | H04L 61/2015 709/226 |

(Continued)

FOREIGN PATENT DOCUMENTS

| | | |
|---|---|---|
| CN | 101052015 A | 10/2007 |
| CN | 101098346 A | 1/2008 |

(Continued)

*Primary Examiner* — Richard G Keehn
(74) *Attorney, Agent, or Firm* — Maier & Maier, PLLC

(57) ABSTRACT

A method for renewing an IP address includes: obtaining, by a controller, DHCP address information from a client, where the DHCP address information includes an IP address of the client, a MAC address of the client, and an address of a DHCP server that assigns the IP address to the client; and when the controller determines that the client is powered off, sending, by the controller by using the address of the DHCP server, an IP renewal request including the IP address and the MAC address to the DHCP server to renew the IP address, until the client registers with the controller. Therefore, the client can use a same IP address every time the client is powered on, and service configurations related to the IP address on the client are continuously effective and do not need to be changed.

12 Claims, 6 Drawing Sheets

(56) References Cited

U.S. PATENT DOCUMENTS

| | | | | |
|---|---|---|---|---|
| 2009/0287847 A1* | 11/2009 | Fan | ................... | H04L 29/12273 |
| | | | | 709/245 |
| 2013/0066931 A1* | 3/2013 | Lacapra | ................ | H04L 67/104 |
| | | | | 707/827 |
| 2016/0036770 A1* | 2/2016 | Chatterjee | ........... | H04L 61/2061 |
| | | | | 709/203 |
| 2016/0099912 A1* | 4/2016 | Wells | ................... | H04L 61/2015 |
| | | | | 709/226 |
| 2016/0134584 A1* | 5/2016 | Lang | ................... | G06F 9/45558 |
| | | | | 709/220 |
| 2016/0269897 A1* | 9/2016 | Lei | ........................ | H04W 12/04 |
| 2017/0163597 A1* | 6/2017 | Amerneni | ........... | H04L 61/2061 |

FOREIGN PATENT DOCUMENTS

| | | | |
|---|---|---|---|
| CN | 101582774 A | 11/2009 | |
| CN | 103327519 A | 9/2013 | |
| CN | 104135384 A | 11/2014 | |

\* cited by examiner

METHOD FOR RENEWING IP ADDRESS AND APPARATUS

CROSS-REFERENCE TO RELATED APPLICATIONS

This application is a continuation of International Application No. PCT/CN2017/088531, filed on Jun. 15, 2017, which claims priority to Chinese Patent Application No. 201610945341.5, filed on Nov. 2, 2016. The disclosures of the aforementioned applications are hereby incorporated by reference in their entireties.

TECHNICAL FIELD

The present invention relates to the field of communications technologies, and in particular, to a method for renewing an IP address and an apparatus.

BACKGROUND

DHCP (Dynamic Host Configuration Protocol, Dynamic Host Configuration Protocol) is a network protocol for a local area network, and works by using UDP (User Datagram Protocol, User Datagram Protocol). The DHCP protocol uses a client/server model. When a DHCP server receives an address information request sent by a client that logs on to a TCP/IP (Transmission Control Protocol/Internet Protocol, Transmission Control Protocol/Internet Protocol) network, the DHCP server sends related address information (information such as an IP address, a gateway address, and a controller address) to the client, so that client address information is configured dynamically.

In an actual application, due to reasons such as security and service requirements, in scenarios such as an enterprise park, and a data center network, a customer usually configures a corresponding controller to manage an access client. As shown in FIG. 1, devices such as a DHCP server 11, a client 12, and a controller 13 constitute a network system. When the client 12 is powered on, the client 12 automatically connects to the DHCP server 11 and sends an address obtaining request to the DHCP server 11 to obtain address information such as an IP address assigned by the DHCP server 11 to the client 12 and a controller address, and then the client 12 actively connects to the controller 13 according to the controller address, to implement management of the client 12 by the controller 13. Then the controller 13 queries the IP address sent by the DHCP server 11 to the client 12, performs, according to the IP address, service configuration related to the IP address on the client 12, and delivers the service configuration to the client 12. The client 12 renews the IP address according to a lease time of the IP address on the DHCP server 11.

In the related art, every time the client 12 is powered on, the client 12 sends an address obtaining request to the DHCP server 11 to obtain information such as an IP address and a controller address. Therefore, when power-off duration of the client 12 exceeds the lease time of the IP address on the DHCP server 11, IP addresses obtained by the client 12 two times may be inconsistent. Consequently, the original service configurations provided by the controller 13 to the client 12 are no longer effective. Therefore, every time the controller 13 manages the client 12, the controller 13 needs to query whether the IP address of the client 12 changes. If the IP address of the client 12 changes, the controller 13 needs to determine which service configurations are related to the IP address, modify, according to a latest IP address, the service configurations related to the IP address, and deliver the service configurations to the client 12, thereby ensuring that the service configurations on the client 12 continue to be effective.

SUMMARY

Embodiments of the present invention provide a method for renewing an IP address and an apparatus, to enable a client to use a same IP address every time the client is powered on and further ensure that service configurations related to the IP address on the client are continuously effective and do not need to be changed.

According to a first aspect, an embodiment of the present invention provides a method for renewing an IP address, where the method includes:

obtaining, by a controller, Dynamic Host Configuration Protocol DHCP address information from a client, where the DHCP address information includes an IP address of the client, a MAC address of the client, and an address of a DHCP server that assigns the IP address to the client; and when the controller determines that the client is powered off, sending, by the controller by using the address of the DHCP server, an IP renewal request including the IP address and the MAC address to the DHCP server to renew the IP address, until the client registers with the controller.

In the method for renewing an IP address according to this embodiment of the present invention, the controller can obtain information such as the IP address of the client, the MAC address of the client, and the address of the DHCP server that assigns the IP address to the client, and when the client is powered off, the controller sends, by using the address of the DHCP server, the IP renewal request including the IP address of the client and the MAC address of the client to the DHCP server to renew the IP address of the client from the DHCP server on behalf of the client. Therefore, it is ensured that the IP address of the client keeps an occupied state during power-off of the client. In this way, when the client is powered on again, the DHCP server can allow the client to use the original IP address of the client (that is, the IP address used before the client is powered off); and correspondingly, service configurations related to the IP address on the client are continuously effective and do not need to be changed either.

With reference to the first aspect, in a first possible implementation of the first aspect, the DHCP address information further includes a lease time of the IP address; and the sending, by the controller by using the address of the DHCP server, an IP renewal request including the IP address and the MAC address to the DHCP server to renew the IP address, until the client registers with the controller includes:

when the controller determines that the client is powered off, sending, by the controller by using the address of the DHCP server, the IP renewal request to the DHCP server, and receiving renewal grant information sent by the DHCP server; and when a time after sending the IP renewal request reaches a half of the lease time (that is, when a difference between a current time and the time of sending the IP renewal request reaches a half of the lease time), sending, by the controller by using the address of the DHCP server, the IP renewal request to the DHCP server again, and receiving renewal grant information sent by the DHCP server, until the client registers with the controller.

In this implementation, the DHCP address information obtained by the controller from the client further includes the lease time of the IP address. The controller may request to renew the IP address from the DHCP server again every time duration of renewing the IP address reaches a half of the lease time, so that the IP address keeps the occupied state. Further, when the client is powered on again, the DHCP server assigns the IP address renewed by the controller to the client for use, so that the client uses the same IP address when powered on two consecutive times. Therefore, the service configurations related to the IP address on the client are continuously effective and do not need to be changed.

With reference to the first aspect, in a second possible implementation of the first aspect, the sending, by the controller by using the address of the DHCP server, an IP renewal request including the IP address and the MAC address to the DHCP server to renew the IP address, until the client registers with the controller includes:

when the controller determines that the client is powered off, sending, by the controller by using the address of the DHCP server, the IP renewal request to the DHCP server, and receiving renewal grant information sent by the DHCP server, where the renewal grant information includes a lease time of the IP address; and when a time after sending the IP renewal request reaches a half of the lease time (that is, when a difference between a current time and the time of sending the IP renewal request reaches a half of the lease time), sending, by the controller by using the address of the DHCP server, the IP renewal request to the DHCP server again, and receiving renewal grant information sent by the DHCP server, until the client registers with the controller.

In this implementation, the controller can obtain the lease time of the IP address from the renewal grant information sent by the DHCP server. Because the lease time of the IP address is in the renewal grant information sent by the DHCP server, the DHCP server can determine the lease time of the IP address according to factors such as occupation duration of the IP address, and the DHCP server controls the lease time of the IP address more flexibly.

With reference to the first aspect, or the first or the second possible implementation of the first aspect, in a third possible implementation of the first aspect, the obtaining, by a controller, Dynamic Host Configuration Protocol DHCP address information from a client includes:

sending, by the controller, a DHCP address information query request to the client; and receiving, by the controller, the DHCP address information fed back by the client according to the DHCP address information query request.

In this implementation, the controller actively sends the DHCP address information query request to the client to obtain the DHCP address information. The controller can determine, according to a running state of the controller, whether to obtain the DHCP address information, to avoid receiving the DHCP address information in an overload state.

With reference to the first aspect, or the first or the second possible implementation of the first aspect, in a fourth possible implementation of the first aspect, the obtaining, by a controller, Dynamic Host Configuration Protocol DHCP address information from a client includes:

receiving, by the controller, the DHCP address information actively sent by the client.

In this implementation, the client actively sends the DHCP address information to the controller. This can effectively reduce interaction between the controller and the client and reduce network traffic when the controller obtains the DHCP address information.

With reference to the fourth possible implementation of the first aspect, in a fifth possible implementation of the first aspect, the method further includes:

when the client managed by the controller is removed from the controller, stopping, by the controller, renewing the IP address from the DHCP server.

In this implementation, the controller can stop renewing the IP address from the DHCP server when the client managed by the controller is removed from the controller. This avoids ineffective renewal of the IP address by the controller.

According to a second aspect, an embodiment of the present invention provides a method for renewing an IP address, where the method includes:

receiving, by a Dynamic Host Configuration Protocol DHCP server, a DHCP request sent by a client when the client is powered on, where the DHCP request includes an IP address of the client, and the IP address is an IP address renewed by a controller from the DHCP server during power-off of the client; and sending, by the DHCP server to the client in response to the DHCP request, DHCP acknowledgement information indicating that the client is allowed to use the IP address, so that the client renews the IP address from the DHCP server after receiving the DHCP acknowledgement information.

In the method for renewing an IP address according to this embodiment of the present invention, the controller renews the IP address on behalf of the client during power-off of the client. Therefore, it is ensured that the IP address of the client keeps an occupied state during power-off of the client. When the client is powered on again, the client can send the DHCP request to the DHCP server; after receiving the DHCP acknowledgement information sent by the DHCP server, the client can renew the same IP address from the DHCP server; and correspondingly, service configurations related to the IP address on the client are continuously effective and do not need to be changed either.

With reference to the second aspect, in a first possible implementation of the second aspect, the sending, by the DHCP server to the client in response to the DHCP request, DHCP acknowledgement information indicating that the client is allowed to use the IP address, so that the client renews the IP address from the DHCP server after receiving the DHCP acknowledgement information includes:

sending, by the DHCP server to the client in response to the DHCP request, the DHCP acknowledgement information indicating that the client is allowed to use the IP address, so that after the client receives the DHCP acknowledgement information, the client establishes a connection to the controller, to implement management of the client by the controller;

receiving, by the DHCP server, an IP renewal request of the client for renewing the IP address; and sending, by the DHCP server, renewal grant information to the client.

In this implementation, after the DHCP server receives the DHCP request, the DHCP server responds by sending, to the client, the DHCP acknowledgement information indicating that the client is allowed to use the IP address. After receiving the DHCP acknowledgement information, the client considers that the DHCP server allows the client to continue to use the IP address included in the DHCP request. Then the client actively registers with the controller to establish a connection to the controller and renew the IP address from the DHCP server. In this implementation, the client renews the IP address in the DHCP request after the client is powered on again. Therefore, the service configurations related to the IP address on the client are continuously effective and do not need to be changed.

According to a third aspect, an embodiment of the present invention provides a method for renewing an IP address, where the method includes:

sending, by a client, Dynamic Host Configuration Protocol DHCP address information to a controller, where the DHCP address information includes an IP address of the client, a MAC address of the client, and an address of a DHCP server that assigns the IP address to the client, so that when the client is powered off, the controller sends, by using the address of the DHCP server, an IP renewal request including the IP address and the MAC address to the DHCP server to renew the IP address, until the client registers with the controller;

when the client is powered on again after powered off, sending, by the client, a DHCP request to the DHCP server, where the DHCP request includes the IP address;

receiving, by the client, DHCP acknowledgement information indicating that the DHCP server allows the client to use the IP address;

registering, by the client, with the controller, to implement management of the client by the controller; and renewing, by the client, the IP address from the DHCP server.

In the method for renewing an IP address according to this embodiment of the present invention, before the client is powered off, the client sends, to the controller, the DHCP address information including information such as the IP address of the client, the MAC address of the client, and the address of the DHCP server that assigns the IP address to the client. During power-off of the client, the controller renews the IP address on behalf of the client. Therefore, it is ensured that the IP address of the client keeps an occupied state when the client is powered off. When the client is powered on again, the client can send the DHCP request to the DHCP server; after receiving the DHCP acknowledgement information sent by the DHCP server, the client can renew the same IP address from the DHCP server; and correspondingly, service configurations related to the IP address on the client are continuously effective and do not need to be changed.

With reference to the third aspect, in a first possible implementation of the third aspect, before the sending, by the client, DHCP address information to the controller, the method further includes:

receiving, by the client, a DHCP address information query request sent by the controller.

In this implementation, the controller actively sends the DHCP address information query request to the client to obtain the DHCP address information. The controller can determine, according to a running state of the controller, whether to obtain the DHCP address information, to avoid receiving the DHCP address information in an overload state.

According to a fourth aspect, an embodiment of the present invention provides a controller, where the controller includes:

an obtaining module, configured to obtain Dynamic Host Configuration Protocol DHCP address information from a client, where the DHCP address information includes an IP address of the client, a MAC address of the client, and an address of a DHCP server that assigns the IP address to the client; and a renewal module, configured to: when determining that the client is powered off, send, by using the address of the DHCP server, an IP renewal request including the IP address and the MAC address to the DHCP server to renew the IP address, until the client registers with the controller.

The controller provided by this embodiment of the present invention can obtain information such as the IP address of the client, the MAC address of the client, and the address of the DHCP server that assigns the IP address to the client, and when the client is powered off, the controller sends, by using the address of the DHCP server, the IP renewal request including the IP address of the client and the MAC address of the client to the DHCP server to renew the IP address of the client from the DHCP server on behalf of the client. Therefore, it is ensured that the IP address of the client keeps an occupied state during power-off of the client. In this way, when the client is powered on again, the DHCP server can allow the client to use the original IP address of the client (that is, the IP address used before the client is powered off); and correspondingly, service configurations related to the IP address on the client are continuously effective and do not need to be changed either.

With reference to the fourth aspect, in a first possible implementation of the fourth aspect, the DHCP address information further includes a lease time of the IP address; and the renewal module includes:

a first renewal submodule, configured to: when determining that the client is powered off, send, by using the address of the DHCP server, the IP renewal request to the DHCP server, and receive renewal grant information sent by the DHCP server; and a second renewal submodule, configured to: when a time after sending the IP renewal request reaches a half of the lease time (that is, when a difference between a current time and the time of sending the IP renewal request reaches a half of the lease time), send, by using the address of the DHCP server, the IP renewal request to the DHCP server again, and receive renewal grant information sent by the DHCP server, until the client registers with the controller.

In this implementation, the DHCP address information obtained by the controller from the client further includes the lease time of the IP address. The controller may request to renew the IP address from the DHCP server again every time duration of renewing the IP address reaches a half of the lease time, so that the IP address keeps the occupied state. Further, when the client is powered on again, the DHCP server assigns the IP address renewed by the controller to the client for use, so that the client uses the same IP address when powered on two consecutive times. Therefore, the service configurations related to the IP address on the client are continuously effective and do not need to be changed.

With reference to the fourth aspect, in a second possible implementation of the fourth aspect, the renewal module includes:

a third renewal submodule, configured to: when determining that the client is powered off, send, by using the address of the DHCP server, the IP renewal request to the DHCP server, and receive renewal grant information sent by the DHCP server, where the renewal grant information includes a lease time of the IP address; and a fourth renewal submodule, configured to: when a time after sending the IP renewal request reaches a half of the lease time (that is, when a difference between a current time and the time of sending the IP renewal request reaches a half of the lease time), send, by using the address of the DHCP server, the IP renewal request to the DHCP server again, and receive renewal grant information sent by the DHCP server, until the client registers with the controller.

In this implementation, the controller can obtain the lease time of the IP address from the renewal grant information sent by the DHCP server. Because the lease time of the IP address is in the renewal grant information sent by the DHCP server, the DHCP server can determine the lease time of the IP address according to factors such as occupation duration of the IP address, and the DHCP server controls the lease time of the IP address more flexibly.

With reference to the fourth aspect, or the first or the second possible implementation of the fourth aspect, in a third possible implementation of the fourth aspect, the obtaining module includes:

a sending submodule, configured to send a DHCP address information query request to the client; and a receiving submodule, configured to receive the DHCP address information fed back by the client according to the DHCP address information query request.

In this implementation, the controller actively sends the DHCP address information query request to the client to obtain the DHCP address information. The controller can determine, according to a running state of the controller, whether to obtain the DHCP address information, to avoid receiving the DHCP address information in an overload state.

With reference to the fourth aspect, or the first or the second possible implementation of the fourth aspect, in a fourth possible implementation of the fourth aspect, the obtaining module is specifically configured to receive the DHCP address information actively sent by the client.

In this implementation, the client actively sends the DHCP address information to the controller. This can effectively reduce interaction between the controller and the client and reduce network traffic when the controller obtains the DHCP address information.

With reference to the fourth possible implementation of the fourth aspect, in a fifth possible implementation of the fourth aspect, the renewal module is further configured to stop renewing the IP address from the DHCP server when the client managed by the controller is removed from the controller.

In this implementation, the controller can stop renewing the IP address from the DHCP server when the client managed by the controller is removed from the controller. This avoids ineffective renewal of the IP address by the controller.

According to a fifth aspect, an embodiment of the present invention provides a Dynamic Host Configuration Protocol DHCP server, where the DHCP server includes:

a receiving module, configured to receive a DHCP request sent by a client when the client is powered on, where the DHCP request includes an IP address of the client, and the IP address is an IP address renewed by a controller from the DHCP server during power-off of the client; and a responding module, configured to send, to the client in response to the DHCP request, DHCP acknowledgement information indicating that the client is allowed to use the IP address, so that the client renews the IP address from the DHCP server after receiving the DHCP acknowledgement information.

According to the DHCP server provided by this embodiment of the present invention, the controller renews the IP address on behalf of the client during power-off of the client. Therefore, it is ensured that the IP address of the client keeps an occupied state during power-off of the client. When the client is powered on again, the client can send the DHCP request to the DHCP server; after receiving the DHCP acknowledgement information sent by the DHCP server, the client can renew the same IP address from the DHCP server; and correspondingly, service configurations related to the IP address on the client are continuously effective and do not need to be changed either.

With reference to the fifth aspect, in a first possible implementation of the fifth aspect, the responding module includes:

a first sending submodule, configured to send, to the client in response to the DHCP request, the DHCP acknowledgement information indicating that the client is allowed to use the IP address, so that after the client receives the DHCP acknowledgement information, the client establishes a connection to the controller, to implement management of the client by the controller;

a receiving submodule, configured to receive an IP renewal request of the client for renewing the IP address; and a second sending submodule, configured to send renewal grant information to the client.

In this implementation, after the DHCP server receives the DHCP request, the DHCP server responds by sending, to the client, the DHCP acknowledgement information indicating that the client is allowed to use the IP address. After receiving the DHCP acknowledgement information, the client considers that the DHCP server allows the client to continue to use the IP address included in the DHCP request. Then the client actively registers with the controller to establish a connection to the controller and renew the IP address from the DHCP server. In this implementation, the client renews the IP address in the DHCP request after the client is powered on again. Therefore, the service configurations related to the IP address on the client are continuously effective and do not need to be changed.

According to a sixth aspect, an embodiment of the present invention provides a client, where the client includes:

a first sending module, configured to send Dynamic Host Configuration Protocol DHCP address information to a controller, where the DHCP address information includes an IP address of the client, a MAC address of the client, and an address of a DHCP server that assigns the IP address to the client, so that when the client is powered off, the controller sends, by using the address of the DHCP server, an IP renewal request including the IP address and the MAC address to the DHCP server to renew the IP address, until the client registers with the controller;

a second sending module, configured to send a DHCP request to the DHCP server when the client is powered on again after powered off, where the DHCP request includes the IP address;

a first receiving module, configured to receive DHCP acknowledgement information indicating that the DHCP server allows the client to use the IP address;

a registration module, configured to enable the client to register with the controller, to implement management of the client by the controller; and a renewal module, configured to renew the IP address from the DHCP server.

According to the client provided by this embodiment of the present invention, before the client is powered off, the client sends, to the controller, the DHCP address information including information such as the IP address of the client, the MAC address of the client, and the address of the DHCP server that assigns the IP address to the client. During power-off of the client, the controller renews the IP address on behalf of the client. Therefore, it is ensured that the IP address of the client keeps an occupied state when the client is powered off. When the client is powered on again, the client can send the DHCP request to the DHCP server; after receiving the DHCP acknowledgement information sent by the DHCP server, the client can renew the same IP address from the DHCP server; and correspondingly, service configurations related to the IP address on the client are continuously effective and do not need to be changed.

With reference to the sixth aspect, in a first possible implementation of the sixth aspect, the client further includes:

a second receiving module, configured to receive, before the first sending module sends the DHCP address information to the controller, a DHCP address information query request sent by the controller.

In this implementation, the controller actively sends the DHCP address information query request to the client to obtain the DHCP address information. The controller can determine, according to a running state of the controller, whether to obtain the DHCP address information, to avoid receiving the DHCP address information in an overload state.

According to a seventh aspect, an embodiment of the present invention provides a communications system, where the communications system includes a controller, a client, and a Dynamic Host Configuration Protocol DHCP server, where the controller is configured to: obtain DHCP address information from the client, where the DHCP address information includes an IP address of the client, a MAC address of the client, and an address of the DHCP server that assigns the IP address to the client; and when the controller determines that the client is powered off, send, by using the address of the DHCP server, an IP renewal request including the IP address and the MAC address to the DHCP server to renew the IP address, until the client registers with the controller;

the client is configured to: send the DHCP address information to the controller; when the client is powered on again after powered off, send a DHCP request to the DHCP server, where the DHCP request includes the IP address; receive DHCP acknowledgement information indicating that the DHCP server allows the client to use the IP address; register with the controller, to implement management of the client by the controller; and renew the IP address from the DHCP server; and the DHCP server is configured to: receive the IP renewal request sent by the controller, and renew the IP address to the client; receive the DHCP request sent by the client when the client is powered on again after powered off; and send, to the client, the DHCP acknowledgement information indicating that the client is allowed to use the IP address.

In the communications system provided by this embodiment of the present invention, the controller can obtain information such as the IP address of the client, the MAC address of the client, and the address of the DHCP server that assigns the IP address to the client. When the client is powered off, the controller sends, by using the address of the DHCP server, the IP renewal request including the IP address of the client and the MAC address of the client to the DHCP server to renew the IP address of the client from the DHCP server on behalf of the client. Therefore, it is ensured that the IP address of the client keeps an occupied state during power-off of the client. In this way, when the client is powered on again, the DHCP server can allow the client to use the original IP address of the client (that is, the IP address used before the client is powered off); and correspondingly, service configurations related to the IP address on the client are continuously effective and do not need to be changed either.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, a person of ordinary skill in the art may still derive other drawings from these accompanying drawings without creative efforts.

DESCRIPTION OF EMBODIMENTS

To make a person skilled in the art understand the technical solutions in the embodiments of the present invention better, and make the objectives, features, and advantages of the embodiments of the present invention clearer, the following further describes the technical solutions in the embodiments of the present invention in detail with reference to the accompanying drawings.

Figure 1:
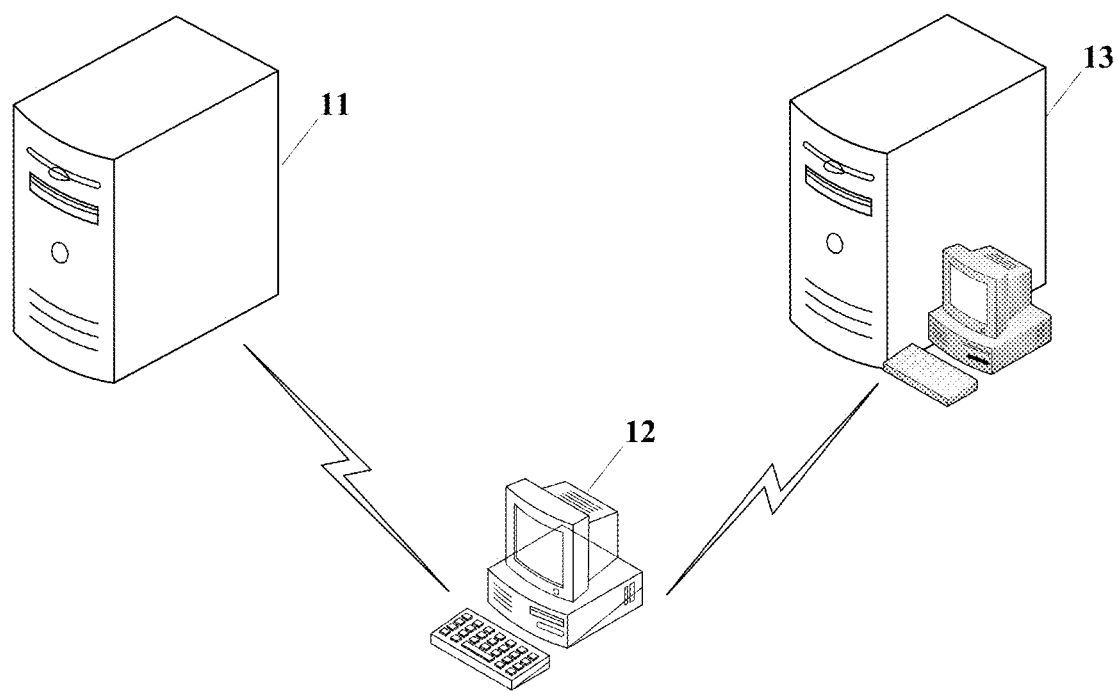
FIG. 1 is a schematic diagram of an application scenario of the related art.
Figure 2:
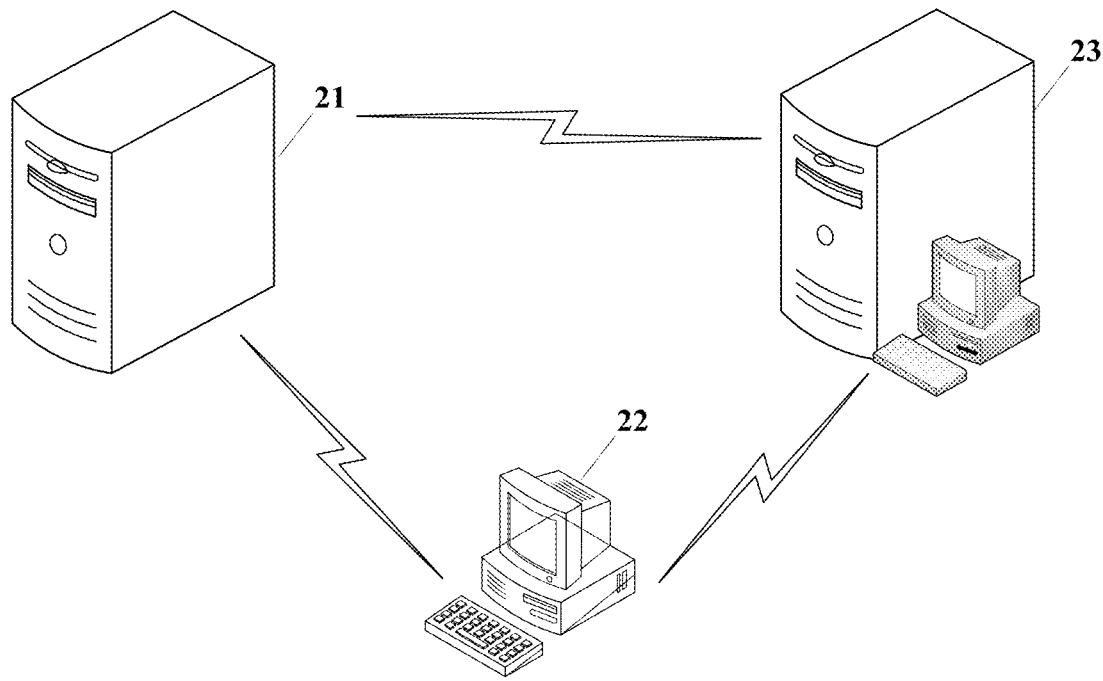
FIG. 2 is a schematic diagram of an application scenario according to an embodiment of the present invention.

Before the technical solutions of the embodiments of the present invention are described, first, an application scenario of the embodiments of the present invention is described with reference to an accompanying drawing. Referring to FIG. 2, FIG. 2 is a schematic diagram of an application scenario according to an embodiment of the present invention. The application scenario includes a DHCP server 21, a client 22, and a controller 23. In a specific process of implementing this embodiment of the present invention, the client 22 may be a computer, a smartphone, a telephone set, a cable TV set-top box, a digital subscriber line router, or the like. The client 22 may be located in a local area network in which the DHCP server 21 is located, or may be located in another local area network. It should be noted that, in an actual application, there may be one or more DHCP servers, one or more clients, and one or more controllers. The client 22 in the application scenario shown in FIG. 2 is only one of the clients, the DHCP server 21 is a DHCP server to which the client 22 is selectively connected, and the controller 23 is allocated by the DHCP server 21 to the client 22 from a plurality of controllers.

The DHCP server 21 can send information such as an IP address and an address of the controller to the client 22 after receiving an address obtaining request sent by the client 22.

Therefore, the client 22 has its IP address in the TCP/IP communication protocol, sends an active register request to the controller 23 by using the received address of the controller, and establishes a connection to the controller 23 after the controller 23 responds to the active register request, to implement management of the client 22 by the controller 23. When the client 22 is powered on, the client 22 may send an address obtaining request to the DHCP server 21. The client 22 may renew the IP address from the DHCP server 21 after establishing the connection to the controller 23. After the controller 23 manages the client 22, the controller 23 may interact with the client 22 to obtain and store information such as the IP address of the client 22, a MAC address of the client 22, and an address of the DHCP server 21, and then renew the IP address of the client 22 from the DHCP server 21 by using the obtained information (the information such as the IP address of the client 22, the MAC address of the client 22, and the address of the DHCP server 21) during power-off of the client 22. In a specific process of implementing this embodiment of the present invention, a device management module, a DHCP relay module, and the like may be disposed in the controller 23 to implement corresponding functions. Specifically, the device management module may be responsible for establishing the connection between the controller 23 and the client 22, and responsible for managing the client 22 that establishes the connection to the controller 23. The DHCP relay module may obtain and store the information such as the IP address of the client 22, the MAC address of the client 22, and the address of the DHCP server 21, and renew the IP address of the client 22 from the DHCP server 21 by using the obtained information (the information such as the IP address of the client 22, the MAC address of the client 22, and the address of the DHCP server 21) when the client 22 is powered off.

In the application scenario shown in FIG. 2, the controller 23 can renew the IP address of the client 22 from the DHCP server 21 on behalf of the client 22 by using the stored information such as the IP address of the client 22, the MAC address of the client 22, and the address of the DHCP server 21 when the client 22 is powered off. Therefore, in this embodiment of the present invention, it can be ensured that the IP address of the client 22 keeps an occupied state during power-off of the client 22. In this way, when the client 22 is powered on again, the DHCP server 21 can allow the client 22 to use the original IP address of the client (that is, the IP address used before the client is powered off); and correspondingly, service configurations related to the IP address on the client 22 are continuously effective and do not need to be changed.

For ease of understanding, operation steps of the DHCP server 21, the client 22, and the controller 23 in the application scenario shown in FIG. 2 are described below respectively by using specific embodiments.

Figure 3:
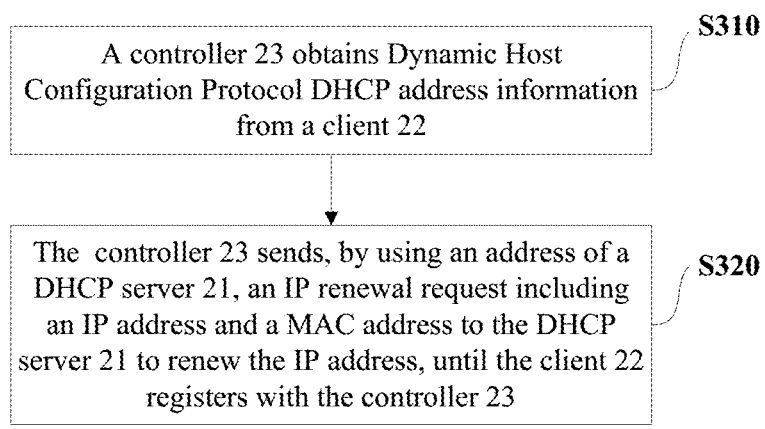
FIG. 3 is a flowchart of a method for renewing an IP address according to an embodiment of the present invention.

Referring to FIG. 3, FIG. 3 is a flowchart of a method for renewing an IP address according to an embodiment of the present invention. This embodiment is performed by a controller 23. Specifically, the method may include the following steps.

In step S310, the controller 23 obtains Dynamic Host Configuration Protocol DHCP address information from a client 22.

The DHCP address information may include an IP address of the client 22, a MAC address of the client 22, and an address of a DHCP server 21 that assigns the IP address to the client 22. In addition, the DHCP address information may further include (or may not include) information such as a lease time of the IP address.

Specifically, in a specific process of implementing this embodiment of the present invention, the controller 23 may actively or passively obtain the DHCP address information. For example, when the controller 23 manages the client 22, the controller 23 may actively send a DHCP address information query request to the client 22; and after receiving the DHCP address information query request, the client 22 sends, to the controller 23 in response to the DHCP address information query request, the DHCP address information including the IP address of the client 22, the MAC address of the client 22, and the address of the DHCP server 21 that assigns the IP address to the client 22. For another example, after the client 22 establishes a connection to the controller 23, the client 22 may actively send the DHCP address information to the controller 23. In this case, the controller 23 may directly receive the DHCP address information sent by the client 22.

When the controller 23 determines that the client 22 is powered off, in step S320, the controller 23 sends, by using an address of a DHCP server 21, an IP renewal request including an IP address and a MAC address to the DHCP server 21 to renew the IP address, until the client 22 registers with the controller 23.

Specifically, the controller 23 may determine, through heartbeat detection, whether the client 22 is powered off; and when the controller 23 determines that the client 22 is powered off, the controller 23 sends, by using the address of the DHCP server 21, the IP renewal request including the IP address and the MAC address to the DHCP server 21 to renew the IP address from the DHCP server 21 on behalf of the client 22, until the client 22 registers with the controller 23. Then the client 22 renews the IP address from the DHCP server 21, and the controller 23 stops renewing the IP address from the DHCP server 21.

In a specific process of implementing the present invention, step S320 may be implemented in a plurality of manners. The following uses an example for description.

For example, in a specific implementation of this embodiment of the present invention, when the DHCP address information further includes the lease time of the IP address, step S320 may include:

when the controller 23 determines that the client 22 is powered off, the controller 23 sends, by using the address of the DHCP server 21, the IP renewal request including the MAC address and the IP address to the DHCP server 21, and receives renewal grant information sent by the DHCP server; and when a time after sending the IP renewal request reaches a half of the lease time (that is, when a difference between a current time and the time of sending the IP renewal request reaches a half of the lease time), the controller 23 sends, by using the address of the DHCP server 21, the IP renewal request including the MAC address and the IP address to the DHCP server 21 again, and receives renewal grant information sent by the DHCP server 21, until the client 22 registers with the controller 23.

When receiving the IP renewal request sent by the controller 23, the DHCP server 21 recognizes the controller 23 as the client 22 according to the MAC address, and sends the renewal grant information to the controller 23. The controller 23 starts timing every time the IP renewal request is sent. When the controller 23 finds that the time after sending the IP renewal request reaches a half of the lease time of the IP address, the controller 23 sends the IP renewal request including the MAC address and the IP address to the DHCP server 21 again, and receives renewal grant information sent by the DHCP server 21. The renewal continues, until the client 22 is powered on again and registers with the controller 23.

For another example, in still another specific implementation of this embodiment of the present invention, step S320 may include:

when the controller 23 determines that the client 22 is powered off, the controller 23 sends, by using the address of the DHCP server 21, the IP renewal request including the MAC address and the IP address to the DHCP server 21, and receives renewal grant information sent by the DHCP server 21, where the renewal grant information includes a lease time of the IP address; and when a time after sending the IP renewal request reaches a half of the lease time (that is, when a difference between a current time and the time of sending the IP renewal request reaches a half of the lease time), the controller 23 sends, by using the address of the DHCP server 21, the IP renewal request including the MAC address and the IP address to the DHCP server 21 again, and receives renewal grant information sent by the DHCP server 21, until the client 22 renews the IP address again.

Specifically, when receiving the IP renewal request sent by the controller 23, the DHCP server 21 recognizes the controller 23 as the client 22 according to the MAC address, and sends the renewal grant information including a renewed lease time of the IP address to the controller 23. Then the controller 23 starts timing every time the IP renewal request is sent. When the controller 23 finds that the time after sending the IP renewal request reaches a half of the lease time of the IP address, the controller 23 sends the IP renewal request including the MAC address and the IP address to the DHCP server 21 again, and receives renewal grant information sent by the DHCP server 21. The renewal continues, until the client 22 is powered on again and registers with the controller 23. In the specific implementation, the DHCP server 21 may add the lease time of the IP address to the renewal grant information every time the renewal grant information is sent to the controller 23, or may add the lease time of the IP address to the renewal grant information only when the renewal grant information is sent to the controller 23 for the first time. When the DHCP server 21 adds the lease time of the IP address to the renewal grant information every time the renewal grant information is sent to the controller 23, the DHCP server 21 can control the lease time of the IP address, so that the lease time of the IP address is more flexible. For example, the DHCP server may make the lease time of the IP address longer. In this way, a time interval for sending the IP renewal request by the controller 23 to the DHCP server is longer. This reduces interaction between the controller 23 and the DHCP server, and reduces network traffic.

It should be noted that, in the foregoing two specific implementations, the controller 23 sends the IP renewal request including the MAC address and the IP address to the DHCP server 21 every time when the time after sending the IP renewal request reaches a half of the lease time. However, in an actual operation, the time of sending the IP renewal request including the MAC address and the IP address to the DHCP server 21 by the controller 23 is not limited thereto. For example, the controller 23 may also send the IP renewal request when the time after sending the IP renewal request reaches $2/3$ or $7/8$ of the lease time (that is, when the difference between the current time and the time of sending the IP renewal request reaches $2/3$ or $7/8$ of the lease time).

In addition, in some application scenarios, the client 22 may be in a power-off state for a long time. In this case, the client 22 managed by the controller 23 may be removed from the controller 23 manually, or it may be so set that the client 22 managed by the controller 23 is automatically removed from the controller 23 when a quantity of times of renewing the IP address by the controller 23 exceeds a specific quantity of times (such as 50 or 100), or when duration of renewing the IP address by the controller 23 exceeds specific duration (such as two hours or four hours). When the client 22 managed by the controller 23 is removed from the controller 23, the controller 23 stops renewing the IP address from the DHCP server 21. In this implementation, the controller 23 can flexibly control whether to renew the IP address.

In the method for renewing an IP address according to this embodiment of the present invention, the controller 23 can obtain information such as the IP address of the client 22, the MAC address of the client 22, and the address of the DHCP server 21 that assigns the IP address to the client, and when the client 22 is powered off, the controller 23 sends, by using the address of the DHCP server 21, the IP renewal request including the IP address of the client 22 and the MAC address of the client 22 to the DHCP server 21 to renew the IP address of the client 22 from the DHCP server 21 on behalf of the client 22. Therefore, it is ensured that the IP address of the client 22 keeps an occupied state during power-off of the client 22. In this way, when the client 22 is powered on again, the DHCP server 21 can allow the client 22 to use the original IP address of the client (that is, the IP address used before the client is powered off); and correspondingly, service configurations related to the IP address on the client 22 are continuously effective and do not need to be changed.

Figure 4:
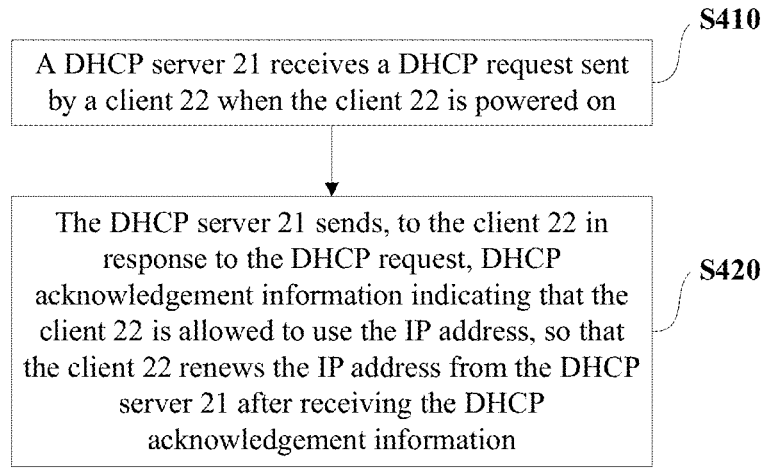
FIG. 4 is a flowchart of another method for renewing an IP address according to an embodiment of the present invention.

Referring to FIG. 4, FIG. 4 is a flowchart of another method for renewing an IP address according to an embodiment of the present invention. This embodiment is performed by a DHCP server 21. Specifically, the method may include the following steps.

In step S410, the DHCP server 21 receives a DHCP request sent by a client 22 when the client 22 is powered on.

The DHCP request includes an IP address of the client 22, and the IP address is an IP address renewed by a controller 23 from the DHCP server 21 during power-off of the client 22.

Specifically, when the client 22 is powered off, the client 22 stores the IP address assigned by the DHCP server 21 to the client 22, and an address of the DHCP server 21, and when the client 22 is power on again, the client 22 sends, to the DHCP server 21, the DHCP request including the IP address previously stored by the client 22. During power-off of the client 22, the controller 23 renews the IP address from the DHCP server 21 on behalf of the client 22 by using the IP address of the client 22, a MAC address of the client 22, and the address of the DHCP server 21 that are obtained by the controller 23 from the client 22.

In a process of renewing the IP address by the controller 23, the controller 23 sends, by using the address of the DHCP server 21, an IP renewal request including the IP address and the MAC address to the DHCP server 21. Correspondingly, after receiving the IP renewal request sent by the controller 23, the DHCP server 21 renews the IP address to the client 22, and specifically, may renew the IP address to the client 22 according to the MAC address in the IP renewal request, that is, renew the IP address to the client (that is, the client 22) corresponding to the MAC address. In a specific implementation, after receiving the IP renewal request sent by the controller 23, the DHCP server 21 may recognize an entity (that is, the controller 23) that sends the IP renewal request, as the client 22 according to the MAC address in the IP renewal request, and further renew the IP address to the client 22.

In step S420, the DHCP server 21 sends, to the client 22 in response to the DHCP request, DHCP acknowledgement information indicating that the client 22 is allowed to use the IP address, so that the client 22 renews the IP address from the DHCP server 21 after receiving the DHCP acknowledgement information.

In a specific process of implementing this embodiment of the present invention, step S420 may be implemented in a plurality of manners. For example, step S420 may include the following steps:

the DHCP server 21 sends, to the client 22 in response to the DHCP request, the DHCP acknowledgement information indicating that the client 22 is allowed to use the IP address, so that after the client 22 receives the DHCP acknowledgement information, the client 22 establishes a connection to the controller 23, to implement management of the client 22 by the controller 23;

the DHCP server 21 receives an IP renewal request of the client 22 for renewing the IP address; and the DHCP server 21 sends renewal grant information to the client 22.

Specifically, after receiving the DHCP request, the DHCP server 21 responds by sending the DHCP acknowledgement information to the client 22. After receiving the DHCP acknowledgement information, the client 22 considers that the DHCP server 21 allows the client 22 to continue to use the IP address included in the DHCP request, and then the client 22 actively registers with the controller 23 to establish the connection to the controller 23, to implement management of the client 22 by the controller. In this case, the controller 23 may stop renewing the IP address in the DHCP request. Further, the client 22 sends the IP renewal request including the MAC address of the client 22 and the IP address in the DHCP request to the DHCP server; and after receiving the IP renewal request of the client 22 for renewing the IP address, the DHCP server 21 sends the renewal grant information to the client 22. In this process, the client 22 can renew the IP address in the DHCP request after the client 22 is powered on again, so that service configurations related to the IP address on the client 22 are continuously effective.

In the method for renewing an IP address according to this embodiment of the present invention, during power-off of the client 22, the controller 23 renews the IP address on behalf of the client 22. Therefore, it is ensured that the IP address of the client 22 keeps an occupied state during power-off of the client 22. When the client 22 is powered on again, the client 22 can send the DHCP request to the DHCP server 21; after receiving the DHCP acknowledgement information sent by the DHCP server 21, the client 22 can renew the same IP address from the DHCP server 21; and correspondingly, the service configurations related to the IP address on the client are continuously effective and do not need to be changed either. Herein it should be noted that the service configurations related to the IP address in this specification may include configurations of a VPN (Virtual Private Network, virtual private network), a static route, NAT (Network Address Translation, network address translation), NQA (Network Quality Analysis, network quality analysis), an ACL (Access Control List, access control list), and the like.

Figure 5:
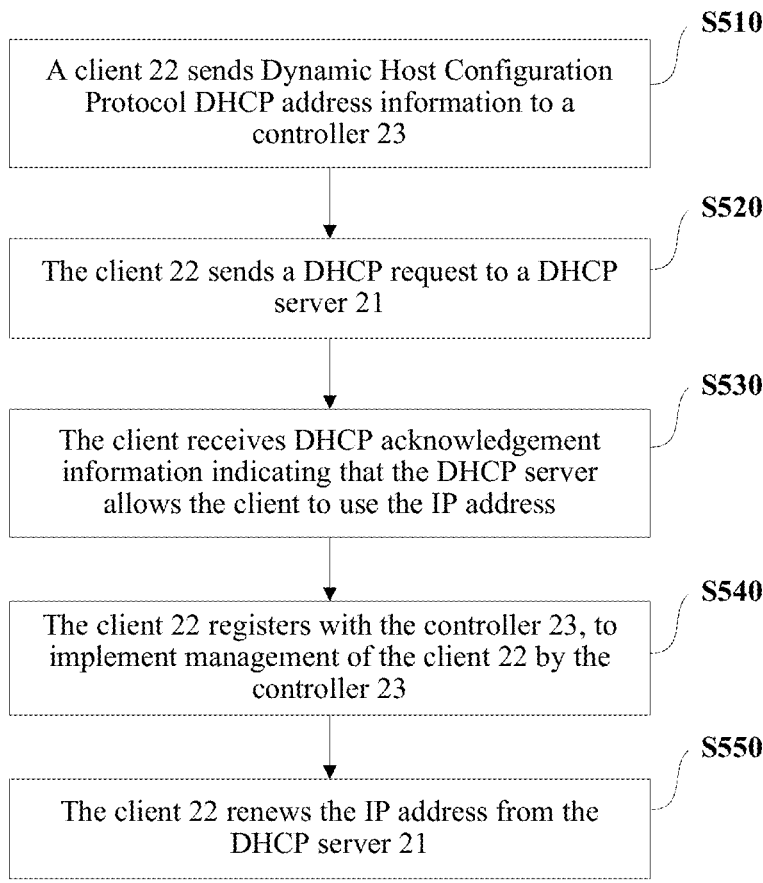
FIG. 5 is a flowchart of still another method for renewing an IP address according to an embodiment of the present invention.

Referring to FIG. 5, FIG. 5 is a flowchart of still another method for renewing an IP address according to an embodiment of the present invention. This embodiment is performed by a client 22. Specifically, the method may include the following steps.

In step S510, the client 22 sends Dynamic Host Configuration Protocol DHCP address information to a controller 23.

The DHCP address information includes an IP address of the client 22, a MAC address of the client 22, and an address of a DHCP server 21 that assigns the IP address to the client 22, so that when the client 22 is powered off, the controller 23 sends, by using the address of the DHCP server 21, an IP renewal request including the IP address and the MAC address to the DHCP server 21, so that the controller 23 renews the IP address from the DHCP server 21 on behalf of the client 22, until the client 22 registers with the controller 23.

In a specific process of implementing this embodiment of the present invention, after the client 22 establishes a connection to the controller 23, the client 22 may actively send the DHCP address information to the controller 23. In another implementation of this embodiment of the present invention, after the client 22 establishes a connection to the controller 23, the controller 23 may send a DHCP address information query request to the client 22; and the client 22 may send the DHCP address information to the controller 23 after receiving the DHCP address information query request.

When the client 22 is powered on again after powered off, in step S520, the client 22 sends a DHCP request to a DHCP server 21.

The DHCP request includes the IP address.

In step S530, the client receives DHCP acknowledgement information indicating that the DHCP server allows the client to use the IP address.

Specifically, because the controller 23 always renews the IP address from the DHCP server 21 before, the DHCP server 21 considers that the IP address is always occupied by the client 22. Therefore, after receiving the DHCP request including the IP address, the DHCP server 21 sends, to the client 22, the DHCP acknowledgement information indicating that the client 22 is allowed to use the IP address.

In step S540, the client 22 registers with the controller 23, to implement management of the client 22 by the controller 23.

The client 22 registers with the controller 23, so that the client 22 establishes the connection to the controller 23, to implement management of the client 22 by the controller 23.

In step S550, the client 22 renews the IP address from the DHCP server 21.

Specifically, the specific step of renewing the IP address by the client 22 from the DHCP server 21 is already described in the embodiments shown in FIG. 3 and FIG. 4, and is not described herein again.

In the method for renewing an IP address according to this embodiment of the present invention, before the client 22 is powered off, the client 22 sends, to the controller, the DHCP address information including information such as the IP address of the client 22, the MAC address of the client 22, and the address of the DHCP server 21 that assigns the IP address to the client 22. During power-off of the client 22, the controller 23 renews the IP address on behalf of the client 22. Therefore, it is ensured that the IP address of the client 22 keeps an occupied state when the client 22 is powered off. When the client 22 is powered on again, the client 22 can send the DHCP request to the DHCP server 21; after receiving the DHCP acknowledgement information sent by the DHCP server 21, the client 22 can renew the same IP address from the DHCP server 21; and correspondingly, service configurations related to the IP address on the client 22 are continuously effective and do not need to be changed.

In the embodiments shown in FIG. 3 to FIG. 5, the methods for renewing an IP address according to the present invention are described from three perspectives: the controller 23, the DHCP server 21, and the client 22. The following describes interaction between a controller 23, a DHCP server 21, and a client 22 systematically by using a specific embodiment.

Figure 6:
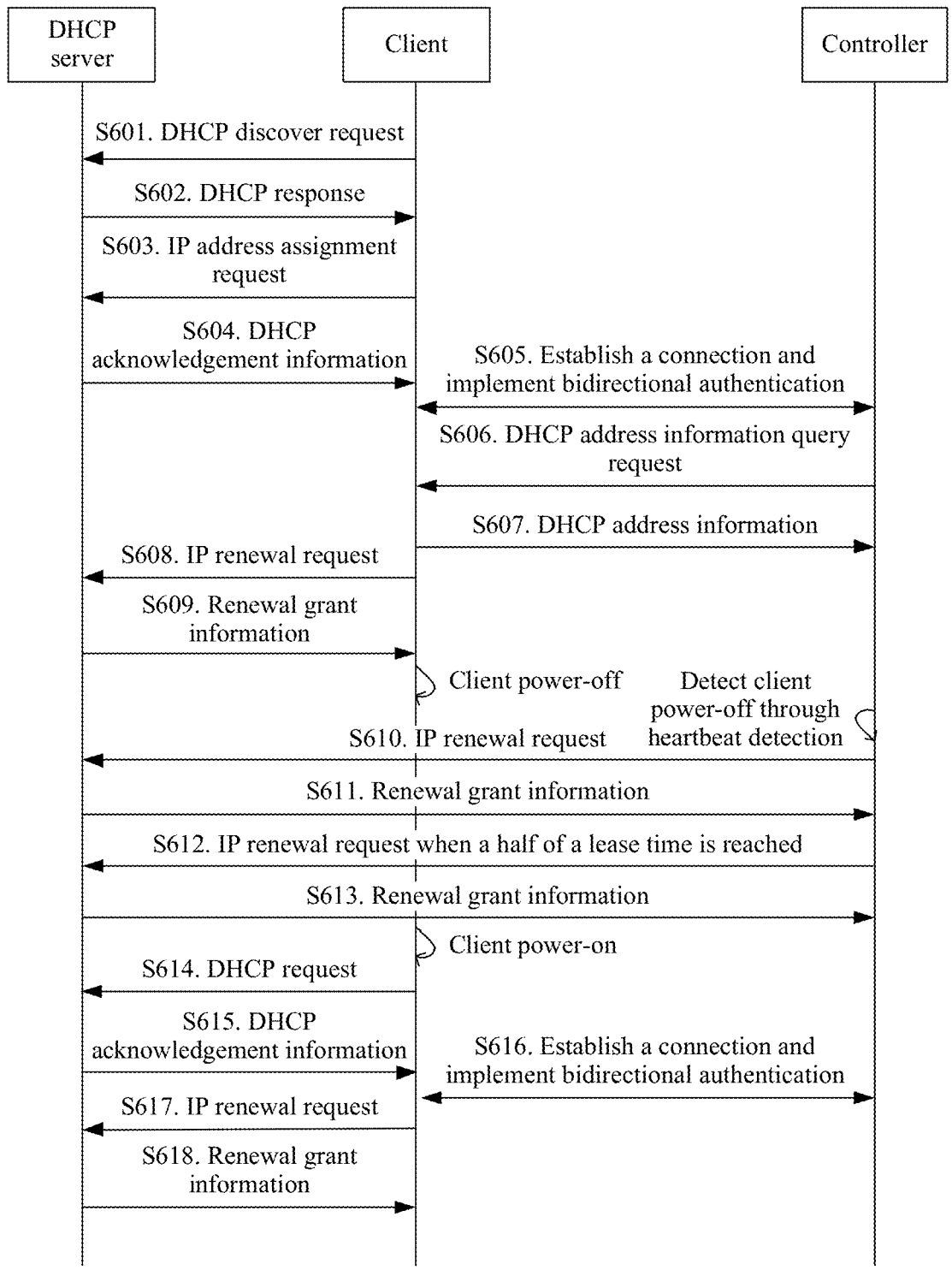
FIG. 6 is a flowchart of still another method for renewing an IP address according to an embodiment of the present invention.

As shown in FIG. 6, FIG. 6 is a flowchart of still another method for renewing an IP address according to an embodiment of the present invention. The method includes the following steps.

In step S601, a client 22 sends a DHCP discover request to all DHCP servers by broadcasting.

In step S602, the client 22 receives DHCP responses sent by all the DHCP servers.

Specifically, after the client 22 sends the DHCP discover request to all the DHCP servers (including a DHCP server 21) by broadcasting, all the DHCP servers can receive the DHCP discover request, and send the DHCP responses to the client 22. The client 22 processes a first received DHCP response, and a DHCP server that sends the first DHCP response is the DHCP server 21. The DHCP response sent by the DHCP server 21 to the client 22 includes information such as an IP address preassigned by the DHCP server to the client 22, a lease time of the IP address, an address of the DHCP server 21, and an address of a controller 23. The DHCP server 21 sends the DHCP response to the client 22, and records information in the DHCP response, such as the IP address preassigned to the client 22 and the address of the controller 23.

In step S603, the client 22 sends an IP address assignment request to a DHCP server 21.

In step S604, the DHCP server sends, to the client 22, DHCP acknowledgement information indicating that the DHCP server agrees to assign an IP address.

After receiving the IP address assignment request, the DHCP server responds by sending, to the client 22, the DHCP acknowledgement information indicating that the DHCP server agrees to assign the IP address. After receiving the DHCP acknowledgement information, the client 22 may use the information included in the DHCP response to complete subsequent steps in cooperation with the DHCP server 21 and the controller 23.

In step S605, the client 22 uses an address of a controller 23 to actively send a register request to the controller 23; and the controller 23 responds to the register request, so that the client 22 establishes a connection to the controller 23, to implement bidirectional authentication between the client 22 and the controller 23, that is, to implement management of the client 22 by the controller 23.

In step S606, the controller 23 sends a DHCP address information query request to the client 22.

In step S607, after receiving the DHCP address information query request, the client 22 sends DHCP address information to the controller 23, where the DHCP address information includes information such as the IP address of the client 22, a MAC address of the client 22, and an address of the DHCP server 21. When receiving the DHCP address information, the controller 23 stores the DHCP address information. The controller 23 may use the IP address of the client 22 and the MAC address of the client 22 to perform service configurations related to the IP address on the client 22, and deliver the service configurations to the client 22.

In step S608, when the client 22 finds that duration of using the IP address by the client 22 is a half or ⅞ of a lease time of the IP address, the client 22 sends an IP renewal request including information such as the IP address and the MAC address of the client 22 to the DHCP server 21.

In step S609, after receiving the IP renewal request sent by the client 22 in step S608, the DHCP server 21 sends renewal grant information to the client 22; after receiving the renewal grant information, the client 22 may continue to use the IP address; and by repeating step S608 and step S609, the client 22 can use the same IP address continuously.

Further, if the client 22 is powered off, when the controller 23 finds, through heartbeat detection, that the client 22 is powered off, step S610 is performed immediately.

In step S610, the controller 23 determines the DHCP server 21 by using the stored address of the DHCP server 21, and sends an IP renewal request including the stored IP address of the client 22 and MAC address of the client 22 to the DHCP server 21.

In step S611, the DHCP server 21 sends renewal grant information to the controller 23 after receiving the IP renewal request sent by the controller 23 in step S610.

In step S612, the controller 23 starts timing when sending the IP renewal request last time; and when the controller 23 finds that a time after sending the IP renewal request reaches a half of the lease time of the IP address, the controller 23 sends the IP renewal request including the MAC address and the IP address to the DHCP server 21 again. For example, the lease time of the IP address is 120 minutes; the controller 23 sends the IP renewal request at 3:00 p.m. and starts timing, and then compares timing duration with a half of the lease time of the IP address, that is, 60 minutes. At 4:00 p.m., the controller 23 finds that the time after sending the IP renewal request is 60 minutes (that is, the difference between the current time and the time of sending the IP renewal request is 60 minutes), reaching a half of the lease time of the IP address, and the controller 23 sends the IP renewal request including the MAC address and the IP address to the DHCP server 21.

In step S613, the DHCP server 21 sends renewal grant information to the controller 23 after receiving the IP renewal request sent by the controller 23 in step S612. Before the client 22 renews the same IP address, the controller 23 repeats step S612 and step S613, that is, may renew the IP address continuously, so that the IP address keeps an occupied state.

When the client 22 is powered on again, in step S614, the client 22 sends a DHCP request including the IP address to the DHCP server 21.

In step S615, after receiving the DHCP request, the DHCP server responds by sending, to the client 22, DHCP acknowledgement information indicating that the client 22 is allowed to use the IP address.

In step S616, after receiving the DHCP acknowledgement information, the client 22 uses the address of the controller 23 to actively send a register request to the controller 23; and the controller 23 responds to the register request, so that the client 22 establishes a connection to the controller, to implement bidirectional authentication between the client 22 and the controller 23, that is, to implement management of the client 22 by the controller 23. After the controller 23 manages the client 22, the client 22 can renew the IP address from the DHCP server 21 again by performing a subsequent step, and the controller 23 stops renewing the IP address.

In step S617, after the client 22 establishes the connection to the controller 23, the client 22 immediately sends an IP renewal request including information such as the IP address and the MAC address of the client 22 to the DHCP server 21.

In step S618, after receiving the IP renewal request sent by the client 22 in step S617, the DHCP server 21 responds by sending renewal grant information to the client 22; and the client 22 can continue to use the IP address after receiving the renewal grant information. Then every time the client 22 finds that duration of using the IP address is a half or ⅞ of the lease time of the IP address, the client 22 sends an IP renewal request including information such as the IP address and the MAC address of the client 22 to the DHCP server 21, so that the client 22 can continuously occupy the IP address.

Specifically, in the specific embodiment shown in FIG. 6, interaction between the client 22 and the DHCP server 21 may be implemented by using DHCP packets. For example, step S601 may be implemented by using a DHCP discover packet; step S602 may be implemented by using a DHCP offer packet; and other steps such as step S603, step S604, and step S608 may be implemented by using a DHCP request packet or a DHCP ACK packet. For a DHCP packet format, refer to FIG. 7.

Figure 7:
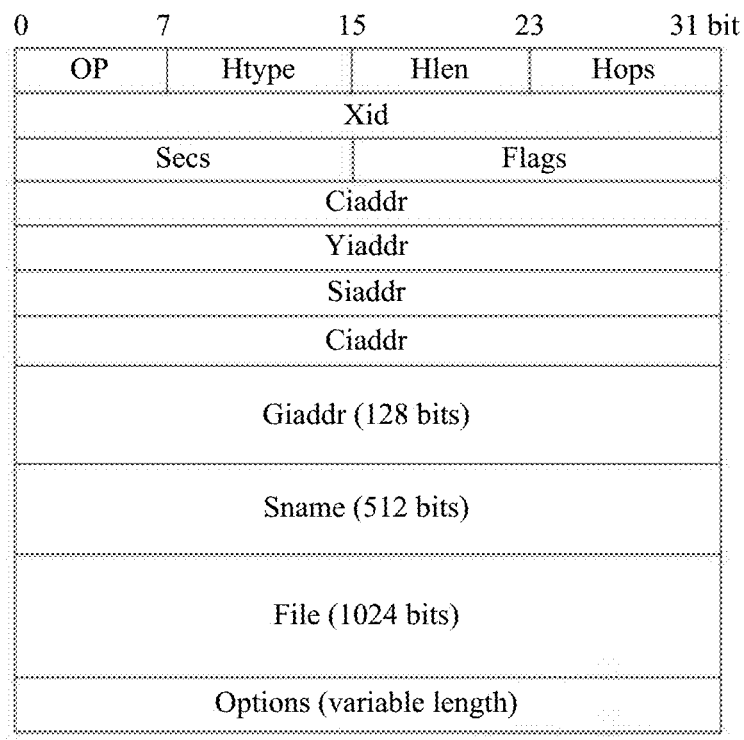
FIG. 7 is a schematic diagram of a DHCP packet format according to an embodiment of the present invention.

In FIG. 7, OP indicates a packet type. Specifically, 1 indicates a request packet, and 2 indicates a response packet.

Hype indicates a type of a hardware address of a network. For example, 1 indicates a hardware address of a 10 Mb/s Ethernet.

Hlen indicates a hardware address length, in units of bytes, and in the Ethernet, the value is 6.

Hops indicates a count of DHCP relays that a current DHCP packet passes through, the field is set to 0 by the client 22, and 1 is added to the field value every time a DHCP relay is passed through.

Xid indicates a random number selected by the client 22, and is used by the DHCP server 21 and the client 22 to exchange requests and responses, and is used by the client to match a request and a response. The random number is set by the client 22 and is returned by the DHCP server 21, and is a 32-bit integer.

Secs indicates a time consumed after the client 22 starts to obtain the address or in the process of renewing/updating the address, in units of seconds.

Flags indicates a flag field, and is a 16-bit field. Currently, only a leftmost bit is useful, where 0 indicates unicast, and 1 indicates broadcast.

Ciaddr indicates the IP address obtained by the client 22, and may be the IP address assigned by the DHCP server 21 to the client 22 or an existing IP address of the client 22, and can be filled in only when the client 22 is in a bound, renew, or rebinding state and can respond to an ARP (Address Resolution Protocol, Address Resolution Protocol) request. In an initial state, the client 22 has no IP address, and this field is 0.0.0.0.

Yiaddr indicates the IP address assigned by the DHCP server 21 to the client (the IP address is the same as the IP address in each step of the embodiments shown in FIG. 3 to FIG. 6). In step S602, the DHCP server 21 preassigns the IP address to the client 22.

Siaddr indicates the address of the DHCP server 21.

Giaddr indicates the address of the controller 23.

Chaddr indicates the MAC address of the client 22, and is filled in before the client 22 sends a DHCP discover packet.

Sname indicates a name of the DHCP server 21, and is filled in by the DHCP server, and if filled in, it needs to be a character string ending with 0.

File indicates a name of a startup configuration file of the client 22, and is filled in by the DHCP server 21, and if filled in, it needs to be a character string ending with 0.

Options indicates a DHCP option field, and is at least 312 bytes. This field includes a DHCP packet type and configuration information allocated by the DHCP server 21 to the client 22, for example, an IP address of a default gateway, an IP address of a DNS server, an IP address of a NetBIOS server, and an effective lease time of the IP address that can be used by the client 22.

It should be noted that, the embodiment shown in FIG. 6 is merely a specific implementation of this embodiment of the present invention. In a specific process of implementing this embodiment of the present invention, renewing the IP address may also be implemented in other manners. For example, in a specific process of implementing this embodiment of the present invention, step S608 and step S609 may precede step S605 and step S606. For another example, the client 22 may alternatively actively send the DHCP address information to the controller 23; in this case, step S606 may be omitted. For another example, in a specific process of implementing this embodiment of the present invention, the DHCP address information may alternatively not include the renewed lease time of the IP address; then the DHCP server specifies the renewed lease time or the like for the controller 23 every time renewal grant information is sent to the controller 23.

In the embodiment shown in FIG. 6, during power-off of the client 22, the controller 23 renews the IP address from the DHCP server 21 on behalf of the client 22, so that the client 22 renews the same IP address when the client 22 is powered on again and the controller 23 manages the client. Therefore, it is ensured that service configurations related to the IP address on the client 22 are continuously effective and do not need to be changed.

In addition, in an actual application, if the controller 23 is interconnected to a third-party system, or a peer device involved in the service configurations related to the IP address is managed by another controller, because the embodiments shown in FIG. 3 to FIG. 6 can ensure that the client 22 always uses the same IP address, in the technical solution of this embodiment of the present invention, the controller 23 also does not need to instruct the third-party system or the another controller to modify corresponding configurations.

Corresponding to the foregoing method embodiments, the present invention further provides embodiments of corresponding apparatuses such as a controller, a DHCP server, and a client.

Figure 8:
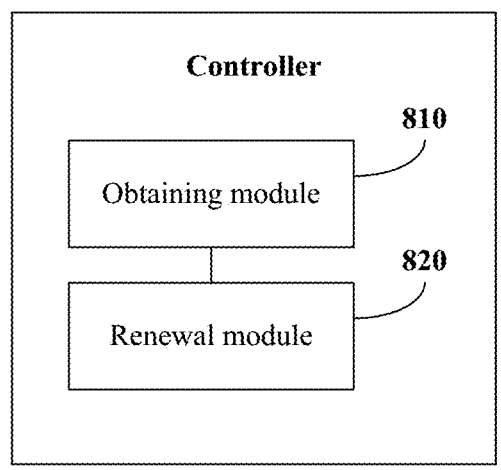
FIG. 8 is a schematic structural diagram of a controller according to an embodiment of the present invention.

Referring to FIG. 8, FIG. 8 is a schematic structural diagram of a controller according to an embodiment of the present invention. The controller is configured to perform the method for renewing an IP address shown in FIG. 3. The controller may include an obtaining module 810 and a renewal module 820.

The obtaining module 810 is configured to obtain Dynamic Host Configuration Protocol DHCP address information from a client, where the DHCP address information includes an IP address of the client, a MAC address of the client, and an address of a DHCP server that assigns the IP address to the client.

The renewal module 820 is configured to: when determining that the client is powered off, send, by using the address of the DHCP server, an IP renewal request including the IP address and the MAC address to the DHCP server to renew the IP address, until the client registers with the controller.

The controller provided by this embodiment of the present invention can obtain information such as the IP address of the client, the MAC address of the client, and the address of the DHCP server that assigns the IP address to the client, and when the client is powered off, the controller sends, by using the address of the DHCP server, the IP renewal request including the IP address of the client and the MAC address of the client to the DHCP server to renew the IP address of the client from the DHCP server on behalf of the client. Therefore, it is ensured that the IP address of the client keeps an occupied state during power-off of the client. In this way, when the client is powered on again, the DHCP server can allow the client to use the original IP address of the client (that is, the IP address used before the client is powered off); and correspondingly, service configurations related to the IP address on the client are continuously effective and do not need to be changed either.

Optionally, in a specific implementation of this embodiment of the present invention, the DHCP address information further includes a lease time of the IP address; and the renewal module 820 may include a first renewal submodule and a second renewal submodule.

The first renewal submodule is configured to: when determining that the client is powered off, send, by using the address of the DHCP server, the IP renewal request to the DHCP server, and receive renewal grant information sent by the DHCP server.

The second renewal submodule is configured to: when a time after sending the IP renewal request reaches a half of the lease time (that is, when a difference between a current time and the time of sending the IP renewal request reaches a half of the lease time), send, by using the address of the DHCP server, the IP renewal request to the DHCP server again, and receive renewal grant information sent by the DHCP server, until the client registers with the controller.

Optionally, in another specific implementation of this embodiment of the present invention, the renewal module 820 may include a third renewal submodule and a fourth renewal submodule.

The third renewal submodule is configured to: when determining that the client is powered off, send, by using the address of the DHCP server, the IP renewal request to the DHCP server, and receive renewal grant information sent by the DHCP server, where the renewal grant information includes a lease time of the IP address.

The fourth renewal submodule is configured to: when a time after sending the IP renewal request reaches a half of the lease time (that is, when a difference between a current time and the time of sending the IP renewal request reaches a half of the lease time), send, by using the address of the DHCP server, the IP renewal request to the DHCP server again, and receive renewal grant information sent by the DHCP server, until the client registers with the controller.

Optionally, in still another specific implementation of this embodiment of the present invention, the obtaining module 810 may include a sending submodule and a receiving submodule.

The sending submodule is configured to send a DHCP address information query request to the client.

The receiving submodule is configured to receive the DHCP address information fed back by the client according to the DHCP address information query request.

Optionally, in still another specific implementation of this embodiment of the present invention, the obtaining module 810 is specifically configured to receive the DHCP address information actively sent by the client.

Optionally, in still another specific implementation of this embodiment of the present invention,
the renewal module 820 is further configured to stop renewing the IP address from the DHCP server when the client managed by the controller is removed from the controller.

Figure 9:
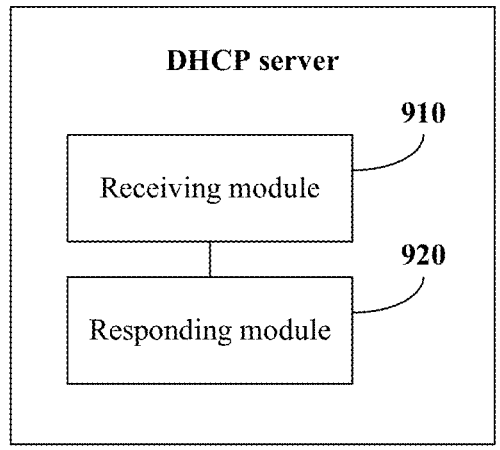
FIG. 9 is a schematic structural diagram of a DHCP server according to an embodiment of the present invention.

Referring to FIG. 9, FIG. 9 is a schematic structural diagram of a Dynamic Host Configuration Protocol DHCP server according to an embodiment of the present invention. The DHCP server is configured to perform the method for renewing an IP address shown in FIG. 4. The DHCP server may include a receiving module 910 and a responding module 920.

The receiving module 910 is configured to receive a DHCP request sent by a client when the client is powered on, where the DHCP request includes an IP address of the client, and the IP address is an IP address renewed by a controller from the DHCP server during power-off of the client.

The responding module 920 is configured to send, to the client in response to the DHCP request, DHCP acknowledgement information indicating that the client is allowed to use the IP address, so that the client renews the IP address from the DHCP server after receiving the DHCP acknowledgement information.

According to the DHCP server provided by this embodiment of the present invention, the controller renews the IP address on behalf of the client during power-off of the client. Therefore, it is ensured that the IP address of the client keeps an occupied state during power-off of the client. When the client is powered on again, the client can send the DHCP request to the DHCP server; after receiving the DHCP acknowledgement information sent by the DHCP server, the client can renew the same IP address from the DHCP server; and correspondingly, service configurations related to the IP address on the client are continuously effective and do not need to be changed either.

Optionally, in a specific implementation of this embodiment of the present invention, the responding module 920 may include a first sending submodule, a receiving submodule, and a second sending submodule.

The first sending submodule is configured to send, to the client in response to the DHCP request, the DHCP acknowledgement information indicating that the client is allowed to use the IP address, so that after the client receives the DHCP acknowledgement information, the client establishes a connection to the controller, to implement management of the client by the controller.

The receiving submodule is configured to receive an IP renewal request of the client for renewing the IP address.

The second sending submodule is configured to send renewal grant information to the client.

Figure 10:
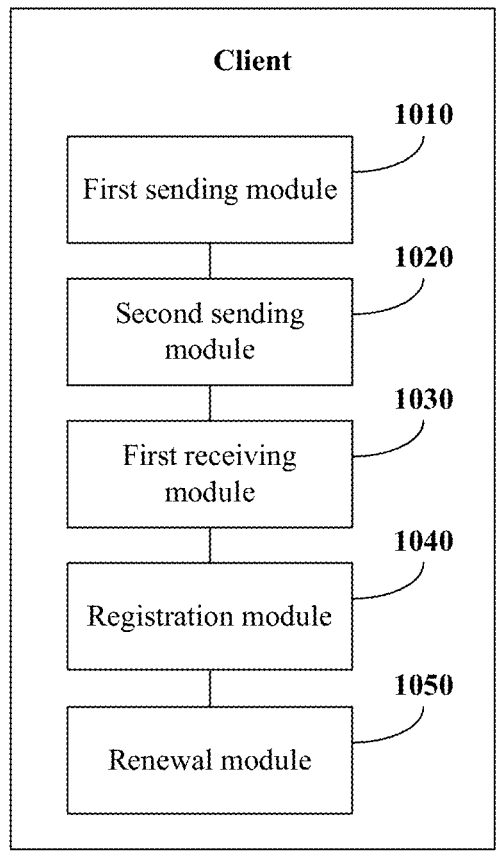
FIG. 10 is a schematic structural diagram of a client according to an embodiment of the invention.

Referring to FIG. 10, FIG. 10 is a schematic structural diagram of a client according to an embodiment of the invention. The client is configured to perform the method for renewing an IP address shown in FIG. 5. The client may include a first sending module 1010, a second sending module 1020, a first receiving module 1030, a registration module 1040, and a renewal module 1050.

The first sending module 1010 is configured to send Dynamic Host Configuration Protocol DHCP address information to a controller, where the DHCP address information includes an IP address of the client, a MAC address of the client, and an address of a DHCP server that assigns the IP address to the client, so that when the client is powered off, the controller sends, by using the address of the DHCP server, an IP renewal request including the IP address and the MAC address to the DHCP server to renew the IP address, until the client registers with the controller.

The second sending module 1020 is configured to send a DHCP request to the DHCP server when the client is powered on again after powered off, where the DHCP request includes the IP address.

The first receiving module 1030 is configured to receive DHCP acknowledgement information indicating that the DHCP server allows the client to use the IP address.

The registration module 1040 is configured to enable the client to register with the controller, to implement management of the client by the controller.

The renewal module 1050 is configured to renew the IP address from the DHCP server.

Before the client provided by this embodiment of the present invention is powered off, the client sends, to the controller, the DHCP address information including information such as the IP address of the client, the MAC address of the client, and the address of the DHCP server that assigns the IP address to the client. During power-off of the client, the controller renews the IP address on behalf of the client. Therefore, it is ensured that the IP address of the client keeps an occupied state when the client is powered off. When the client is powered on again, the client can send the DHCP request to the DHCP server; after receiving the DHCP acknowledgement information sent by the DHCP server, the client can renew the same IP address from the DHCP server; and correspondingly, service configurations related to the IP address on the client are continuously effective and do not need to be changed.

Optionally, in a specific implementation of this embodiment of the present invention, the client may further include a second receiving module.

The second receiving module is configured to receive, before the first sending module sends the DHCP address information to the controller, a DHCP address information query request sent by the controller.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product may be stored in a storage medium, such as a ROM/RAM, a hard disk, or an optical disc, and includes several instructions for instructing a computer device (which may be a personal computer, a server, a network device, or the like) to perform the methods described in the embodiments or some parts of the embodiments of the present invention.

The embodiments in this specification are all described in a progressive manner, for same or similar parts in the embodiments, reference may be made to these embodiments, and each embodiment focuses on a difference from other embodiments. Especially, system and apparatus embodiments are basically similar to the method embodiments, and therefore are described briefly. For related parts, refer to descriptions in the method embodiments.

The foregoing descriptions are implementations of the present invention, but are not intended to limit the protection scope of the present invention. Any modification, equivalent replacement, and improvement made without departing from the spirit and principle of the present invention shall fall within the protection scope of the present invention.

What is claimed is:

1. A method for renewing an Internet Protocol (IP) address, wherein the method comprises:
    obtaining, by a controller, Dynamic Host Configuration Protocol (DHCP) address information from a client, wherein the DHCP address information comprises an IP address of the client, a media access control (MAC) address of the client, and an address of a DHCP server that assigns the IP address to the client;
    when the controller determines that the client is powered off, sending, by the controller by using the address of the DHCP server, an IP renewal request comprising the IP address and the MAC address to the DHCP server to renew the IP address until the client registers with the controller; and
    receiving, by the controller, renewal grant information sent by the DHCP server,
    wherein obtaining, by the controller, DHCP address information from the client comprises:
    sending, by the controller, a DHCP address information query request to the client; and
    receiving, by the controller, the DHCP address information fed back by the client according to the DHCP address information query request.

2. The method according to claim 1, wherein:
    the DHCP address information further comprises a lease time of the IP address; and
    sending, by the controller by using the address of the DHCP server, the IP renewal request comprising the IP address and the MAC address to the DHCP server to renew the IP address, until the client registers with the controller comprises:
        when the controller determines that the client is powered off, sending, by the controller by using the address of the DHCP server, the IP renewal request to the DHCP server; and
        when a time after sending the IP renewal request reaches a half of the lease time, sending, by the controller by using the address of the DHCP server, the IP renewal request to the DHCP server again, and receiving renewal grant information sent by the DHCP server, until the client registers with the controller.

3. The method according to claim 1, wherein:
    the renewal grant information comprises a lease time of the IP address; and
    sending, by the controller by using the address of the DHCP server, the IP renewal request comprising the IP address and the MAC address to the DHCP server to renew the IP address, until the client registers with the controller comprises:
        when the controller determines that the client is powered off, sending, by the controller by using the address of the DHCP server, the IP renewal request to the DHCP server; and
        when a time after sending the IP renewal request reaches a half of the lease time, sending, by the controller by using the address of the DHCP server, the IP renewal request to the DHCP server again, and receiving renewal grant information sent by the DHCP server, until the client registers with the controller.

4. The method according to claim 1, wherein obtaining, by the controller, DHCP address information from the client comprises:
    receiving, by the controller, the DHCP address information actively sent by the client.

5. The method according to claim 4, further comprising:
    when the client managed by the controller is removed from the controller, stopping, by the controller, renewing the IP address from the DHCP server.

6. A method for renewing an Internet Protocol (IP) address, wherein the method comprises:
- sending, by a client, Dynamic Host Configuration Protocol (DHCP) address information to a controller, wherein the DHCP address information comprises an IP address of the client, a media access control (MAC) address of the client, and an address of a DHCP server that assigns the IP address to the client, so that when the client is powered off, the controller sends, by using the address of the DHCP server, an IP renewal request comprising the IP address and the MAC address to the DHCP server to renew the IP address, until the client registers with the controller;
- when the client is powered on again after powered off, sending, by the client, a DHCP request to the DHCP server, wherein the DHCP request comprises the IP address;
- receiving, by the client, DHCP acknowledgement information indicating that the DHCP server allows the client to use the IP address;
- registering, by the client, with the controller, to implement management of the client by the controller; and
- renewing, by the client, the IP address from the DHCP server,
- wherein before sending, by the client, DHCP address information to the controller, the method further comprises:
- receiving, by the client, a DHCP address information query request sent by the controller.

7. A controller, comprising a processing hardware platform executing instructions stored on a storage medium to perform:
- obtaining Dynamic Host Configuration Protocol (DHCP) address information from a client, wherein the DHCP address information comprises an Internet Protocol (IP) address of the client, a MAC address of the client, and an address of a DHCP server that assigns the IP address to the client; and
- when determining that the client is powered off, sending, by using the address of the DHCP server, an IP renewal request comprising the IP address and the MAC address to the DHCP server to renew the IP address, until the client registers with the controller; and
- receiving renewal grant information sent by the DHCP server,
- wherein the processing hardware platform executes the instructions to perform:
- sending a DHCP address information query request to the client; and
- receiving the DHCP address information fed back by the client according to the DHCP address information query request.

8. The controller according to claim 7, wherein:
the DHCP address information further comprises a lease time of the IP address; and
the processing hardware platform executes the instructions to perform:
- when determining that the client is powered off, sending, by using the address of the DHCP server, the IP renewal request to the DHCP server; and
- when a time after sending the IP renewal request reaches a half of the lease time, sending, by using the address of the DHCP server, the IP renewal request to the DHCP server again, and receiving renewal grant information sent by the DHCP server, until the client registers with the controller.

9. The controller according to claim 7, wherein:
the renewal grant information sent by the DHCP server comprises a lease time of the IP address; and
the processing hardware platform executes the instructions to perform:
- when determining that the client is powered off, sending, by using the address of the DHCP server, the IP renewal request to the DHCP server, and receiving renewal grant information sent by the DHCP server; and
- when a time after sending the IP renewal request reaches a half of the lease time, sending, by using the address of the DHCP server, the IP renewal request to the DHCP server again, and receiving renewal grant information sent by the DHCP server, until the client registers with the controller.

10. The controller according to claim 7, wherein the processing hardware platform executes the instructions to perform: receiving the DHCP address information actively sent by the client.

11. The controller according to claim 10, wherein the processing hardware platform executes the instructions to perform: stopping renewing the IP address from the DHCP server when the client managed by the controller is removed from the controller.

12. A client, comprising a processing hardware platform executing instructions stored on a storage medium to perform:
- sending Dynamic Host Configuration Protocol (DHCP) address information to a controller, wherein the DHCP address information comprises an Internet Protocol (IP) address of the client, a media access control (MAC) address of the client, and an address of a DHCP server that assigns the IP address to the client, so that when the client is powered off, the controller sends, by using the address of the DHCP server, an IP renewal request comprising the IP address and the MAC address to the DHCP server to renew the IP address, until the client registers with the controller;
- sending a DHCP request to the DHCP server when the client is powered on again after powered off, wherein the DHCP request comprises the IP address;
- receiving DHCP acknowledgement information indicating that the DHCP server allows the client to use the IP address;
- enabling the client to register with the controller, to implement management of the client by the controller; and
- renewing the IP address from the DHCP server,
- wherein the processing hardware platform executes the instructions to further perform:
- receiving, before sending the DHCP address information to the controller, a DHCP address information query request sent by the controller.

* * * * *